(12) United States Patent
Gopalakrishna Alevoor et al.

(10) Patent No.: US 9,069,607 B1
(45) Date of Patent: Jun. 30, 2015

(54) SELECTIVE MIGRATION OF VIRTUALIZED APPLICATIONS AND CONFIGURATION SETTINGS THEREOF

(75) Inventors: Prarthana Gopalakrishna Alevoor, Mysore (IN); Akshay Prabhakar Mirajkar, Bangalore (IN); Dattathreya Sathyamurthy, Bangalore (IN); Jonathan Clark, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 643 days.

(21) Appl. No.: 13/363,084

(22) Filed: Jan. 31, 2012

(51) Int. Cl.
- *G06F 9/455* (2006.01)
- *G06F 9/48* (2006.01)
- *G06F 9/50* (2006.01)

(52) U.S. Cl.
CPC .......... *G06F 9/4856* (2013.01); *G06F 9/45558* (2013.01); *G06F 9/5077* (2013.01)

(58) Field of Classification Search
None
See application file for complete search history.

(56) References Cited

U.S. PATENT DOCUMENTS

| | | | |
|---|---|---|---|
| 5,953,532 A | 9/1999 | Lochbaum | |
| 7,383,327 B1* | 6/2008 | Tormasov et al. | 709/220 |
| 8,756,598 B1* | 6/2014 | Costea et al. | 718/1 |
| 2002/0083430 A1 | 6/2002 | Kusuda et al. | |
| 2002/0144250 A1* | 10/2002 | Yen | 717/168 |
| 2003/0084010 A1 | 5/2003 | Bigus et al. | |
| 2005/0257265 A1 | 11/2005 | Cook et al. | |
| 2006/0190575 A1* | 8/2006 | Harvey et al. | 709/222 |
| 2007/0283324 A1 | 12/2007 | Geisinger | |
| 2008/0010630 A1 | 1/2008 | Ou-Yang | |
| 2008/0126785 A1 | 5/2008 | Chong | |
| 2008/0270515 A1* | 10/2008 | Chen et al. | 709/202 |
| 2009/0077664 A1 | 3/2009 | Hsu et al. | |
| 2009/0228531 A1* | 9/2009 | Baumann et al. | 707/204 |
| 2009/0260007 A1* | 10/2009 | Beaty et al. | 718/1 |
| 2009/0271787 A1* | 10/2009 | Clark | 718/1 |
| 2009/0313620 A1 | 12/2009 | Sedukhin et al. | |
| 2010/0275252 A1 | 10/2010 | Yun | |
| 2010/0325624 A1* | 12/2010 | Bartolo et al. | 717/176 |
| 2011/0010710 A1 | 1/2011 | Thrush et al. | |
| 2011/0010756 A1 | 1/2011 | Choi | |
| 2011/0035755 A1* | 2/2011 | Huang et al. | 718/106 |
| 2012/0198362 A1* | 8/2012 | Urban et al. | 715/762 |
| 2013/0054734 A1* | 2/2013 | Bond et al. | 709/217 |

OTHER PUBLICATIONS

Flex Profile immidio.com/flexprofiles/.
Laplink PC Mover—laplink.com/business_solutions/pcmover/pcmover.html.
Thin App User's Guide 4.0.4 EN-000117-04. p. 34, 95-99 kb.vmware.com/selfservice/microsites/search.do?language=en_US&cmd=displayKC&externalId=1017364).

\* cited by examiner

*Primary Examiner* — Tammy Lee

(57) ABSTRACT

User configurations of an installed application are migrated by isolating them from a base application state of the installed application to generate a virtual application package. At runtime, a base virtual application package and a user configurations virtual application package are provisioned from a central repository and executed by the user. The resulting virtualized execution environment merges the application resources contained in the packages such that the user configurations override the base application to make available all of the user configurations. This technique may be used to preserve user configurations during migration of applications, or to maintain user-specific configurations for a particular application across different sessions of a user's virtualized desktop.

13 Claims, 8 Drawing Sheets

SELECTIVE MIGRATION OF VIRTUALIZED APPLICATIONS AND CONFIGURATION SETTINGS THEREOF

BACKGROUND

Desktop migrations have become commonplace as users frequently upgrade operating systems, purchase new hardware, and perform disaster recovery. Generally, desktop images are tightly coupled with applications installed thereon and this coupling presents special challenges during desktop migrations. For example, when a user migrates from one version of an operating system (e.g., Windows® XP) to another (e.g., Windows® 7), it is typical for the user to lose all of the installed applications and configurations. In order to recover them, the user needs to go through the cumbersome process of manually reinstalling applications and reconfiguring them after upgrading to the new version of the operating system.

Similar challenges are present when a desktop running on a physical machine is migrated to a cloud-based environment (or simply, the "cloud") that employs a client-server computing model for enabling desktop virtualization, wherein the "virtualized" desktop, including all of the programs, applications, processes, and data, resides in a remote central server, instead of the local machine, and users access their virtualized desktops through client software running locally on their physical machines. Known physical-to-virtual (P2V) techniques for full conversion of physical machines to virtual machines (VMs) are not appropriate solutions for desktop migration to the cloud, in situations where the base operating system changes or there is insufficient storage to replicate complete desktop images. Another issue is that P2V techniques have bandwidth transmission requirements that are much higher than bandwidth that can be provided by network links typically connected to laptop and desktop users. In addition, where desktop images of multiple users are migrated to the cloud and the migrated desktop images include the same applications, migration using P2V techniques results in inefficient use of cloud storage and increased cost of running the cloud, because the same applications are stored redundantly in the cloud.

SUMMARY

One or more embodiments of the present invention provide techniques for desktop migration, in particular selective application and state migration, in a storage and bandwidth efficient manner. In accordance with these techniques, during migration from an original system to a new system, user configurations are isolated from an application running in the original system using a template which identifies user configuration locations, and a virtual application package containing the user configurations is generated per application. When a user wishes to launch the application in the new system, the virtual application package containing the user configurations are merged into a virtual application package corresponding to the application and the merged application package is executed to provide the user with the original desktop experience. Embodiments of the invention also centrally store changes to the user configurations, enabling the user to have updated configurations available for any desktop session.

A method for migrating application settings customized by a user for an installed application having a plurality of application resources, according to an embodiment of the present invention, includes the step of retrieving an application configurations template that identifies a location within a first execution environment of a subset of application resources of the application. The subset of application resources define one or more user configurations for the application customized by the user, wherein remaining application resources of the application define a base application state. The method further includes the step of generating a virtual application package that includes the subset of application resources for the application associated with the user, wherein the virtual application package is configured to merge with a base virtual application package comprising the base application state executing in a second execution environment.

Further embodiments of the present invention include, without limitation, a non-transitory computer-readable storage medium that includes instructions that enable a processing unit to implement one or more aspects of the above method as well as a computer system configured to implement one or more aspects of the above method.

DETAILED DESCRIPTION

Figure 1A:
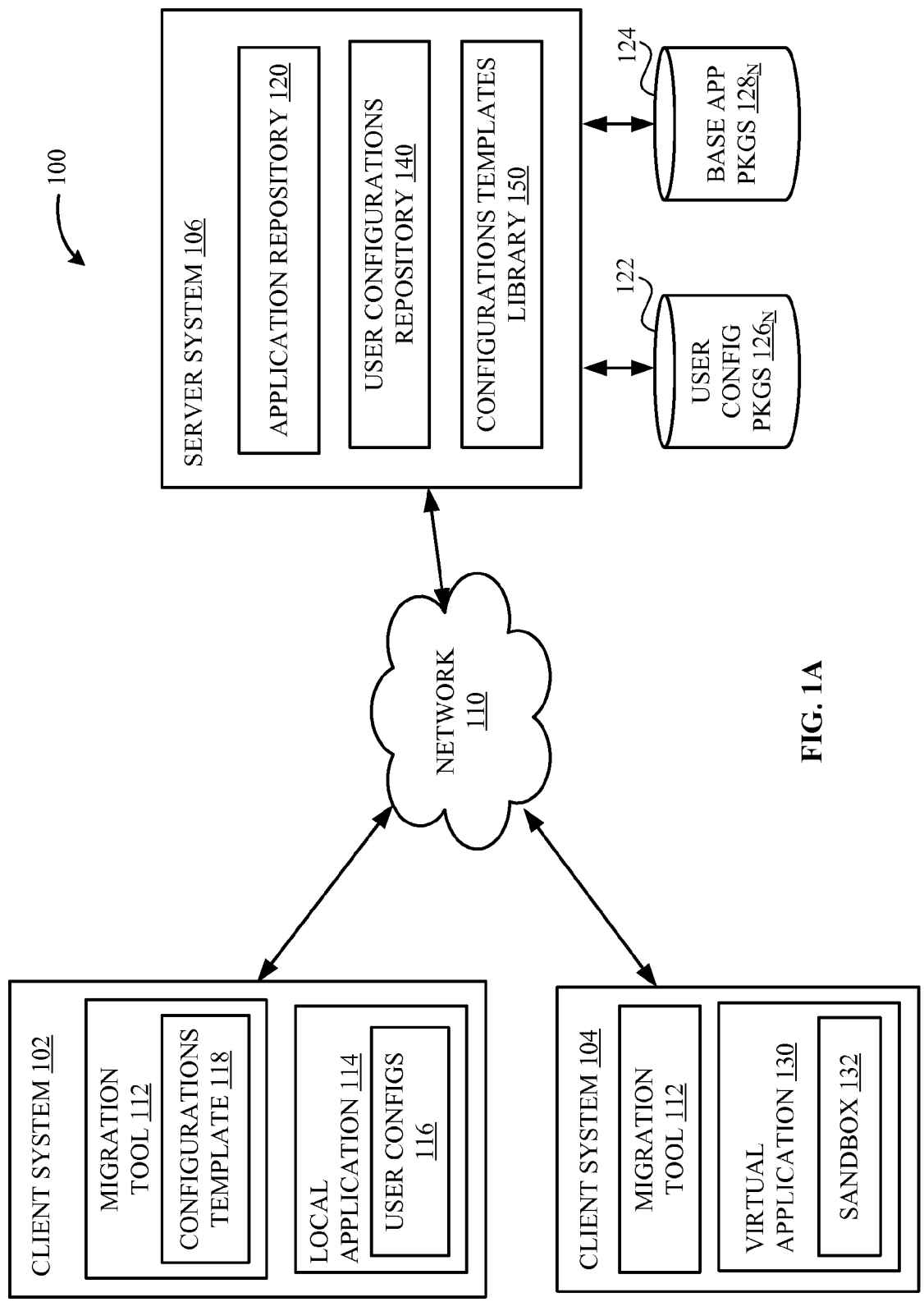
FIG. 1A is a block diagram that illustrates an exemplary computer system with which one or more embodiments of the present invention may be utilized.

FIG. 1A is a block diagram that illustrates an exemplary computer system 100 in which one or more embodiments of the present invention may be utilized. The computer system 100 includes client systems 102, 104 communicatively connected via a network 110 to a server system 106 configured to provide one or more applications and facilitate application migration techniques described herein. The network 110 may be a local area network (LAN) connection, a wide area network (WAN), or other suitable communications network.

Figure 1B:
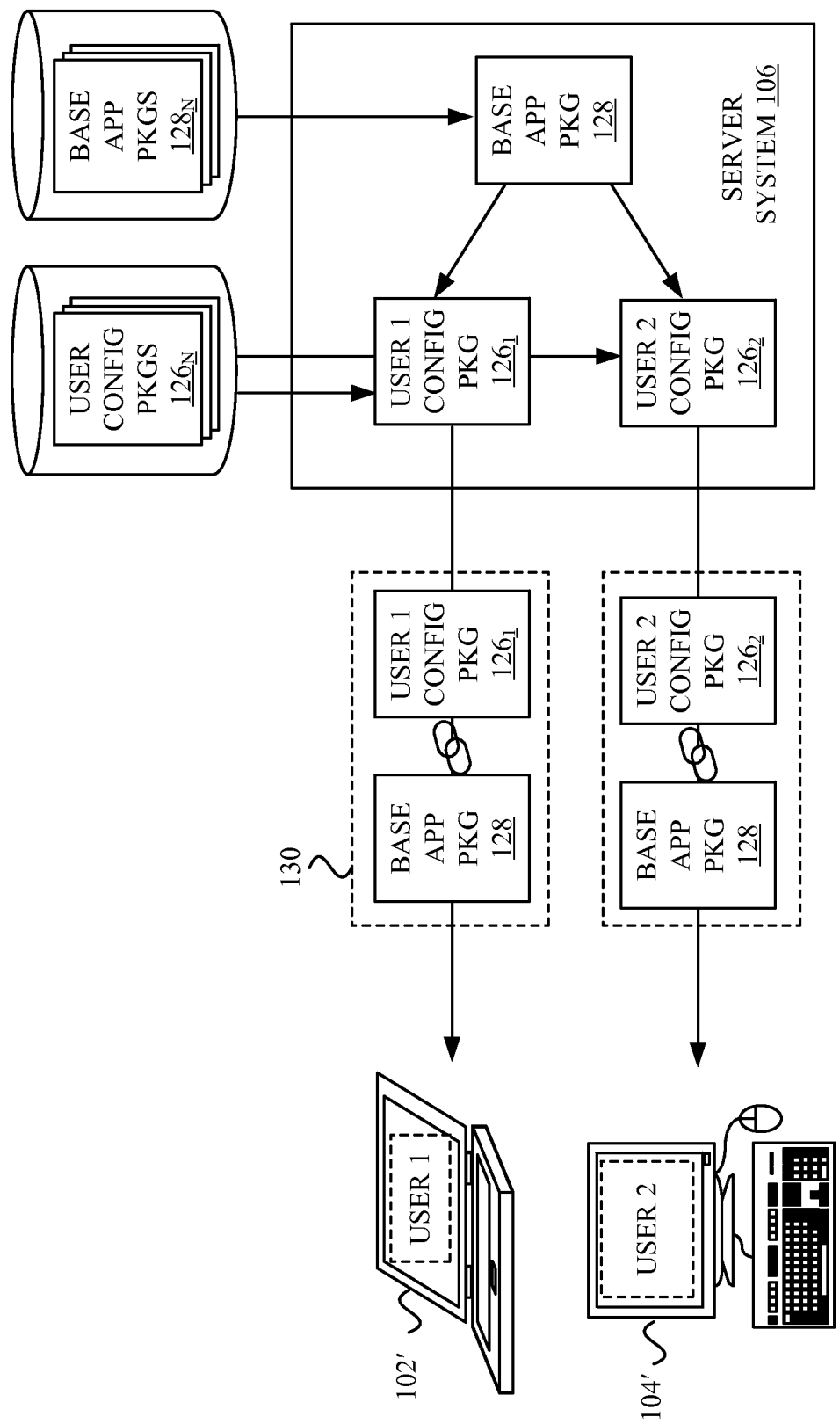
FIG. 1B is a block diagram that schematically illustrates the application migration process according to an embodiment of the present invention.

The client system 102 is configured to be operable by a system administrator or other suitable user to migrate one or more applications installed on the client system 102 and any user configurations for the applications to another system, for example, a client system 102' shown in FIG. 1B, according to embodiments of the invention described herein. In one embodiment, the client system 102 is configured to communicate with the server system 106 to execute application migration from an application locally installed at the client system 102 (e.g., local application 114) to a virtual application that is centrally stored by the server system 106 and that may be provisioned for and executed by the client system 102'. The client system 102 may be any general purpose computer device that includes conventional components, such as a processor, memory, storage, and network interface. Alternatively, the client system 102 may be a virtual machine (VM) sharing the hardware resources (e.g., processor, memory, storage, and/or networking resources) of a host computer (not shown).

The client system 102 includes a local application 114 having one or more user configurations 116 associated therewith and a migration tool 112 used in migrating the local application 114. As used herein, the term "application" generally refers to computer software, including, for example and without limitation, a stand-alone application, a run-time library or framework, and a plug-in or extension. In one embodiment, an application, such as the local application 114, is associated with a plurality of files and system settings used when executing the application (referred to herein as "application resources"). The application resources may include, but are not limited to, executable files, data files, shared library files, environmental variables, and registry settings. In some embodiments, a subset of the application resources represents the one or more user configurations 116 (sometimes referred to as "customizations," "preferences," "profile settings", or "application state"). The user configurations 116 may include values associated with a particular user for one or more application settings (e.g., custom font sizes, a startup homepage, saved login credentials), custom application logic (e.g., macros, scripts), and other settings. It is noted that the remaining application resources for the local application 114 represent the default state or "clean install" of the local application 114 and is also referred to herein as a "base application". While the local application 114 and the user configurations 116 are depicted as nested elements in FIG. 1, it is understood that the user configurations 116 may be a plurality of files and system settings stored separately from the local application 114 within the client system 102, such as in a individual user directory or preferences folder.

Application virtualization is a generally known technique for decoupling an application from its underlying operating system to eliminate application conflicts and streamline application delivery and management. One example of a solution that provides application virtualization is ThinApp®, made available by VMware, Inc. of Palo Alto, Calif. A virtual application may be generated by encapsulating application resources into a virtual application package that can be deployed, managed, and updated independently from the underlying operating system (OS). The application package may include an executable software layer logically interposed between the OS and the application that provides a sandbox-type of environment (sometimes referred to as a "virtualized environment") isolated, or partially isolated, from the underlying OS or other applications. As such, the virtual applications do not make any changes to the underlying OS and continue to behave the same across different configurations for compatibility, consistent end-user experiences, and ease of management. Further, two or more virtual application packages may be "linked" in a parent-child relationship. When packages are linked in such a manner, ThinApp® will load the virtual environment of the base package, scan for any linked packages, and then merge the virtual environments of the base and linked packages into a single virtual environment. Further details of this linking feature are provided in U.S. patent application Ser. No. 12/429,472, filed Apr. 24, 2009 and entitled "Linking Virtualized Application Namespaces at Runtime," the entire contents of which are incorporated by reference herein.

According to embodiments of the invention, the migration tool 112 is configured to generate a virtual application package containing one or more user configurations 116 (herein referred to as a "user configuration package"), so that the user configurations 116 can be efficiently transferred (i.e., migrated) to a newly provisioned system, such as the client system 102'. The migration tool 112 identifies the user configurations 116 for the local application 114 from among the application resources on the client system 102 by utilizing a configurations template 118, which may be obtained from server system 106, as will be described below in greater detail in conjunction with FIG. 2.

The server system 106 includes an application repository 120 and user configurations repository 140 to centrally manage and store a plurality of virtual applications that may be shared among a number of users. The server system 106 may further include a library 150 of configurations templates (e.g., configurations templates 118) associated with individual applications 130. The server system 106 may provide access control functionality that associates virtual applications stored therein with authorized user(s) and/or groups of users. The server system 106 may be any computer system having conventional components, such as a processor, memory, storage, and network interface. The server system 106 includes storage systems 122, 124 configured to store virtual application packages. The storage systems 122, 124 may be any conventional storage system accessible over the network 110, such as shared storage, network shares, databases, or network-based file systems.

In one embodiment, the application repository 120 is configured to stream base application packages $128_N$ to requesting client systems. Each base application package $128_N$ represents a "clean" version of an application. The base application packages $128_N$ available from the application repository 120 may be predetermined and provided by a system administrator or other suitable user managing the computer system 100. The application repository 120 provides storage savings as only a single copy of an application needs to be stored, and provisioned to a client system only when a user logs in and launches the application. For example, if each application requires 500 MB of storage, and each user has at least 10 applications, then for a system setup to support 100 users, conventional techniques would require approximately 500 GB of storage. However, utilizing the techniques described herein, a base applications stored in the application repository 120 would use 5 GB for the 10 virtual applications plus a small additional amount, approximately 100*1 MB of user configuration packages in some embodiments, to require a total of 5.1 GB of storage, greatly increasing storage efficiency.

The server system 106 further includes the user configurations repository 140 configured to stream corresponding user configuration packages $126_N$ to requesting client systems. The server system 106 receives user configuration packages generated by the migration tool 112 and makes the user configuration package available for migration to other clients via the user configurations repository 140, as described in detail below. The user configuration packages $126_N$ are configured on a per-application, per-user basis such that each individual user configuration package contains configurations made by a particular user for an individual application. Alternatively, the user configuration packages $126_N$ may be configured on a per-user basis (i.e., each user configuration package contains cumulative configurations for all applications made by a particular user.)

In one implementation, the application repository 120 is a centrally accessible network share (e.g., \\app-repos) where the base application packages $128_N$ are located. The user configurations repository 140 may be a separate repository (e.g., \\user-state) where the user configuration packages $126_N$ are stored in directories by username (e.g., \\user-state\<username>\Winword.dat). In another implementation, particularly in cases of migrating to client systems 104 that might go offline, such as laptops, the base application packages $128_N$ and user configuration packages $126_N$ may be copied onto the client machine, rather than accessed directly on a network share.

To simplify the description of the embodiments illustrated herein, techniques for migrating applications and their state are described herein as migrating an application installed on a physical computer device (i.e., client system 102) to a virtual machine (i.e., client system 102'). However, it is understood that embodiments of the invention may be extended to other scenarios of application migration. For example, an application and its state may be migrated from one physical machine to another physical machine, from a system running one operating system version to the same system running a newer operating system version, or from one virtual machine to another virtual machine. In another example, application migration occurs within a virtualization environment known as Virtualized Desktop Infrastructure (VDI), which is commercially available from VMware, Inc. In this example, an application and its state may be "migrated" from one VDI client session to another VDI client session. This example is described next with the client system 104.

The client system 104 represents a client session within a VDI environment. The client system 104 is configured to capture any user configurations made to applications executing on the client system 104 such that the user configurations may be available and utilized in later sessions, for example, in client system 104' shown in FIG. 1B. In one embodiment, the client system 104 is configured to communicate with the server system 106 to provision one or more virtual applications from the server system 106 and to retain one or more user configurations on the server system 106. In one embodiment, the client system 104 is configured to execute a virtual application 130 provisioned from the application repository 120 and retain changes to the virtual application 130 from one session to another.

The virtual application 130 includes a reserved directory, referred to as a sandbox 132, which contains runtime modifications to application resources of the virtual application 130. Any changes, deletions, or additions made by the virtual application 130 to the file system or registry are recorded in the sandbox 132 rather than in the underlying operating system or system disk of client system 104. The virtual application 130 may be configured at runtime or at package time to locate the sandbox 132 in a variety of locations, for example, in a user's profile directory (e.g., %AppData%\Thinstall), in the same directory as the virtual application 130, or other configurable location, such as a network drive.

While known techniques for application virtualization may utilize the sandbox 132 to store per-user application settings, the sandbox 132 may not be sufficiently flexible to support a variety of use cases where application state migration is desired. For example, locating the sandbox 132 at a shared network drive results in a user's application settings and configurations being unavailable to a portable computer that go offline. In another example, locating the sandbox 132 at a local subdirectory relative to the virtual application 130 would be incompatible for use in shared environments because it would require each user to have their own copy of the virtual application 130.

Accordingly, in some embodiments, the client system 104 includes a migration tool 112 configured to collect changes made during execution of the virtual application 130, for example, as recorded in the sandbox 132, and generate a user configuration package 126 based on the collected changes. Upon conclusion of subsequent sessions, the migration tool 112 updates the user configuration package 126 based on changes to the virtual application 130 performed during each session. In one embodiment, the migration tool 112 of the client system 104 may transmit the user configuration package 126 to the server system 106 for storage by the user configurations repository 140. Accordingly, the user configurations associated with the user continue to be available to the user at any client session that relies on the virtual application being streamed from the server system 106. In an alternative embodiment where the client system 104 utilizes a persistent disk model, the user configuration package 126 may be stored in local persistent storage.

FIG. 1B is a block diagram that illustrates computer system 100 of Figure 1A after application migration to client systems 102' and 104', according to one embodiment of the present invention. When a user may logs into new client systems 102', 104' and provisions the virtual application 130, the server system 106 retrieves and streams a copy of a base application package 128 for the virtual application 130 from the application repository 120. The server system 106 may further retrieve from the user configurations repository 140 and stream to the requesting client system any user configuration packages $126_N$ corresponding to the virtual application 130. The user configurations repository 140 stores a different user configuration package for each application and for each user. For example, for the client system 102' operated by a user identified as "User 1", the user configurations repository 140 retrieves a user configuration package $126_1$ that is associated with User 1 and with a particular application (i.e., having User 1's configurations for the virtual application 130).

For each client system 102', 104' that requested a virtual application, the base application package 128 of the virtual application is linked to the user configuration packages $126_1$, $126_2$ corresponding to the requesting user and the virtual application, such that the user configurations contained in the user configuration packages $126_1$, $126_2$ are merged into the virtualized execution environment of the base virtual application. As a result, users have all of their customizations in the virtual applications executing in their respective client systems 102', 104' and are thereby provided with the same desktop experience as if the virtual applications are being executed in the client systems 102, 104, respectively.

In one embodiment, the client systems 102', 104' include the migration tool 112 that is further configured to update the user configuration packages $126_1$, $126_2$ based on changes made during execution of the virtual applications in client systems 102', 104'. This migration tool 112 transmits updated user configuration packages to the server system 106 for storage by the user configurations repository 140. As a result, the user configurations associated with a user may continue to be available to the user at any client system that may stream the virtual application from the application repository 120.

Accordingly, embodiments of the invention provide a multi-step technique for a complete application migration from an "old" system (e.g., "source" client system 102, 104) to a "new" system (e.g., "target" client system 102', 104') as described herein. In a first step, a user configuration package 126 is generated that contains the user configurations 116 of an installed (i.e., non-virtual) application on the source client system, as will be further described in conjunction with FIG. 2. In a second step, a virtual application 130 that utilizes the user configuration package 126 is provisioned on the target client system, as will be further described in conjunction with FIGS. 6A and 6B. In a third step, the user configuration application package 126 is updated to track changes to any user configurations 116 that may have been modified during a session on the target client system.

Figure 2:
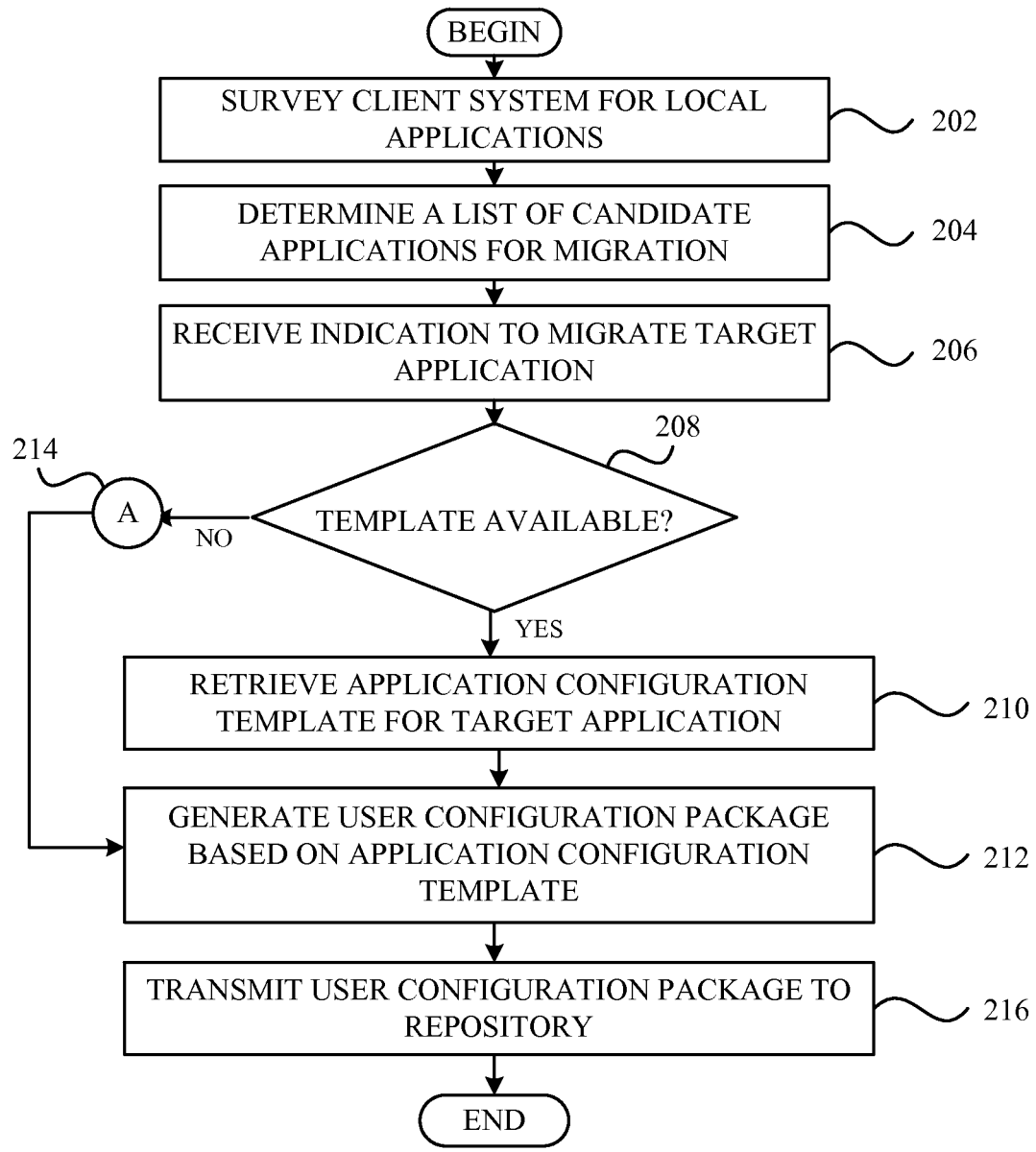
FIG. 2 is a flow diagram that illustrates steps for a method for generating a user configuration package according to an embodiment of the present invention.

FIG. 2 is a flow diagram that illustrates steps for generating a user configuration package 126, according to one embodiment of the present invention. At step 202, the migration tool 112 surveys the source client system to determine a list of local applications installed on the source client system. In one implementation, the migration tool 112 determines the local applications installed based on data from a system registry of the source client system (e.g., HKEY_LOCAL_MACHINES\SOFTWARE\Microsoft\Windows\CurrentVersion\Uninstall). The migration tool 112 utilizes such fields as 'DisplayName' and 'Version' fields from the system registry to determine the details of the applications installed on the source client system.

At step 204, a list of candidate applications for migration is determined by matching the list of the installed applications against a list of base virtual applications available from the application repository 120. As described above, the base virtual applications present in the application repository 120 are packages of "clean state" applications without any configurations or customizations. In one implementation, the migration tool 112 performs a loose-match' for the installed applications against the list of base virtual applications. For example, the migration tool 112 may attempt to get an exact match of the application name and its version number. If an exact match is not found with respect to the name and version of the application, then the migration tool 112 matches for a latest available version of the same application. The list of candidate applications is provided to the user, and at step 206, an indication is received of whether to migrate one or more target applications from the source client system.

Figure 3:
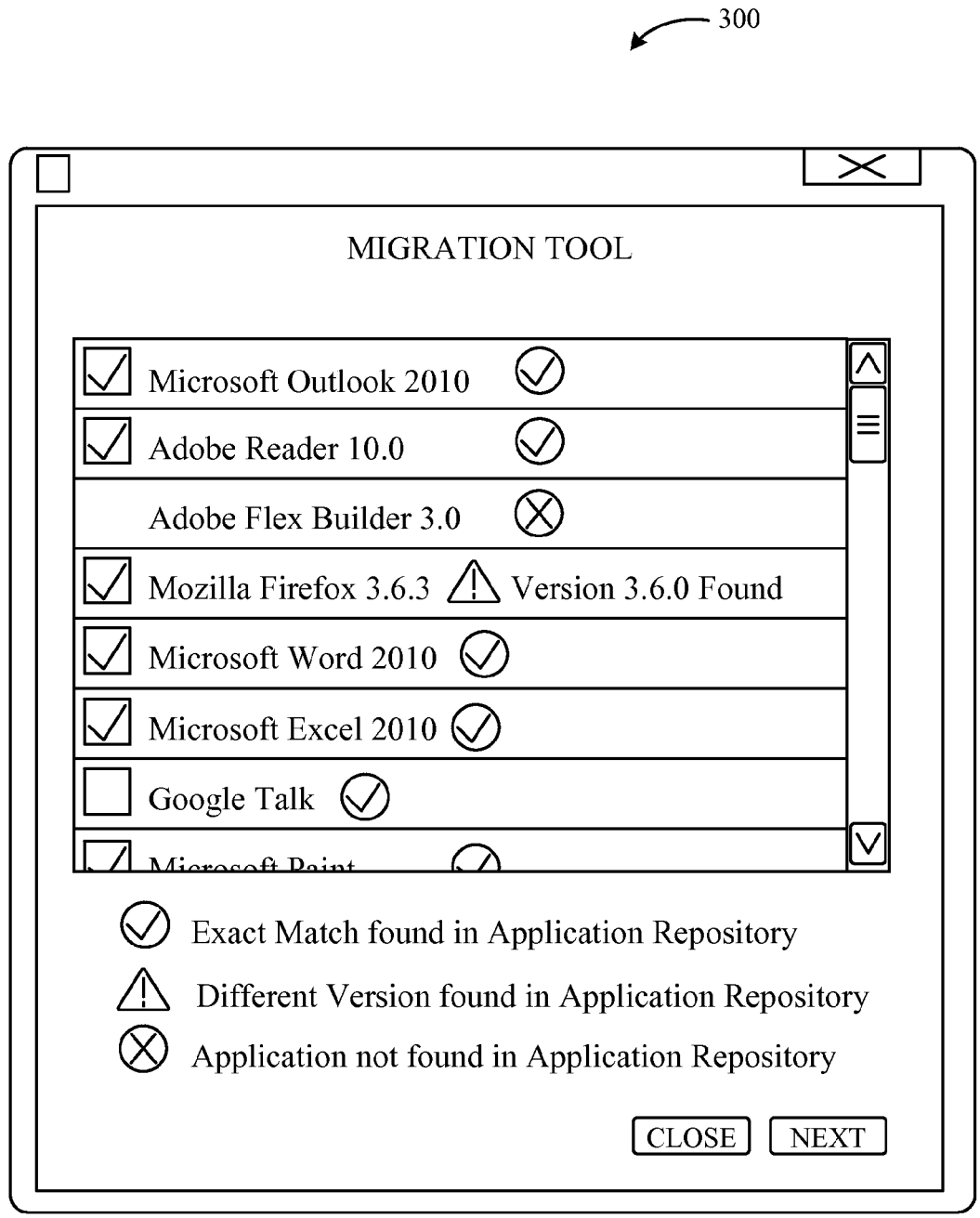
FIG. 3 shows an example user interface for selecting applications to be migrated.

FIG. 3 shows an example user interface 300 for selecting applications to be migrated. As shown, the user interface 300 provides the user with the list of candidate applications that may be migrated. The user interface 300 may indicate that whether an exact match or different version of an application is available in the application repository 120. The user interface further provides the user with an option to select or deselect a particular application should the user not wish to proceed with migration of the particular application (e.g., to a virtual version of the application). The user interface 300 may indicate if an application is not available at all from the application repository 120 (i.e., no match has been found). Accordingly, the migration tool 112 obtains a selective list of applications, as indicated by the user, to be provisioned in the target client system.

Returning to FIG. 2, responsive to receiving an indication to migrate a target application, the user configurations for all the target applications are collected and encapsulated in a user configuration package. The user configurations for all the target applications may be collected using a variety of approaches.

In one approach, a configurations template 118 corresponding to a target application is utilized to identify the locations of application resources that provide the user configurations for that target application. The configurations template 118 includes a list of application resources (e.g., files, system settings, registry keys) that would be modified and/or created due to user customizations of the applications. The configurations template 118 may specify a name of the application with which the template 118 is associated and one or more version numbers with which the configurations template 118 has been predetermined to be compatible. In one implementation, the configurations template 118 is a package configuration file having an "INI" format of name-value pairs (e.g., "BaseDir1", "BaseReg1") that specify file system and registry paths to the application resources representing user configurations.

The configurations template 118 is generated using a process that profiles an application's configuration behavior when executing common configuration activities on a clean virtual environment (i.e., VM). One example procedure for generating a configurations template 118 will be described in detail in conjunction with FIG. 4. In one embodiment, a plurality of configurations templates 118 for common applications is pre-generated and provided to users as a library of configurations templates.

At step 208, the migration tool 112 checks if a pre-determined configurations template 118 is available for the target application. If available, the pre-determined configurations template 118 is retrieved at step 210 and the process flow proceeds to step 212. In one embodiment, for example, the configurations template 118 is retrieved from a local library of configurations templates provided by local storage, a remote storage device, removable storage medium (e.g., CD-ROM), and/or other suitable storage media. In another embodiment, the configurations template 118 is retrieved from the configurations templates library 150 stored at the server system 106 based on a name of the target application, a name and version number of the target application name, and other suitable identifiers.

If no configurations template 118 can be found for the target application, then at step 214, the user performs a procedure for generating a configurations template 118, as will be described in conjunction with FIG. 4, and proceeds to step 212. At step 212, a virtual application package may be generated based on the configurations template 118 by using the template to scan user desktop and gather user configurations, i.e., all the changes the user has performed on the application. The details of the user configuration package 126 are shown in FIG. 5. At step 216, the generated user configuration package is transmitted to the application repository 120.

In one embodiment, if configurations template 118 is not available or cannot be generated at the time, the migration tool 112 attempts to retrieve the user configurations by gathering data from pre-determined locations on the operating system of the source client system that commonly used to store user configurations, by expert knowledge or by standards. For example, for applications installed on the Microsoft Windows operating system, a pre-determined location for per-user application-specific files may be scanned, such as C:\Documents and Settings\Administrator\Application Data\<Application Name>. The migration tool 112 utilizes the information located at the pre-determined locations to generate the user configuration package. It should be recognized that while this approach may not guarantee a complete capture of user customization information, the approach may provide a sufficient capture of user configurations.

In an alternative embodiment, the migration tool 112 may gather user configurations for all applications as a single user configuration package. This package may be generated by encapsulating all files and registry keys from the source client system with the exception of several files and registry keys. Directory folders containing user documents and files stored on a user's desktop, such as "Desktop" and "My Documents" folders, may be excluded because these files are typically migrated separately as user data. In one embodiment, a reference copy of various operating systems is used to build a list of excluded files and registry keys. Files and registry keys that are part of the base operating system may be excluded because they typically exist on the target client system. In yet another example, files and registry keys that are part of matched virtual applications (i.e., in application repository 120) may be excluded because these files and registry keys are made available on the target client system via base virtual application packages 128.

Figure 4:
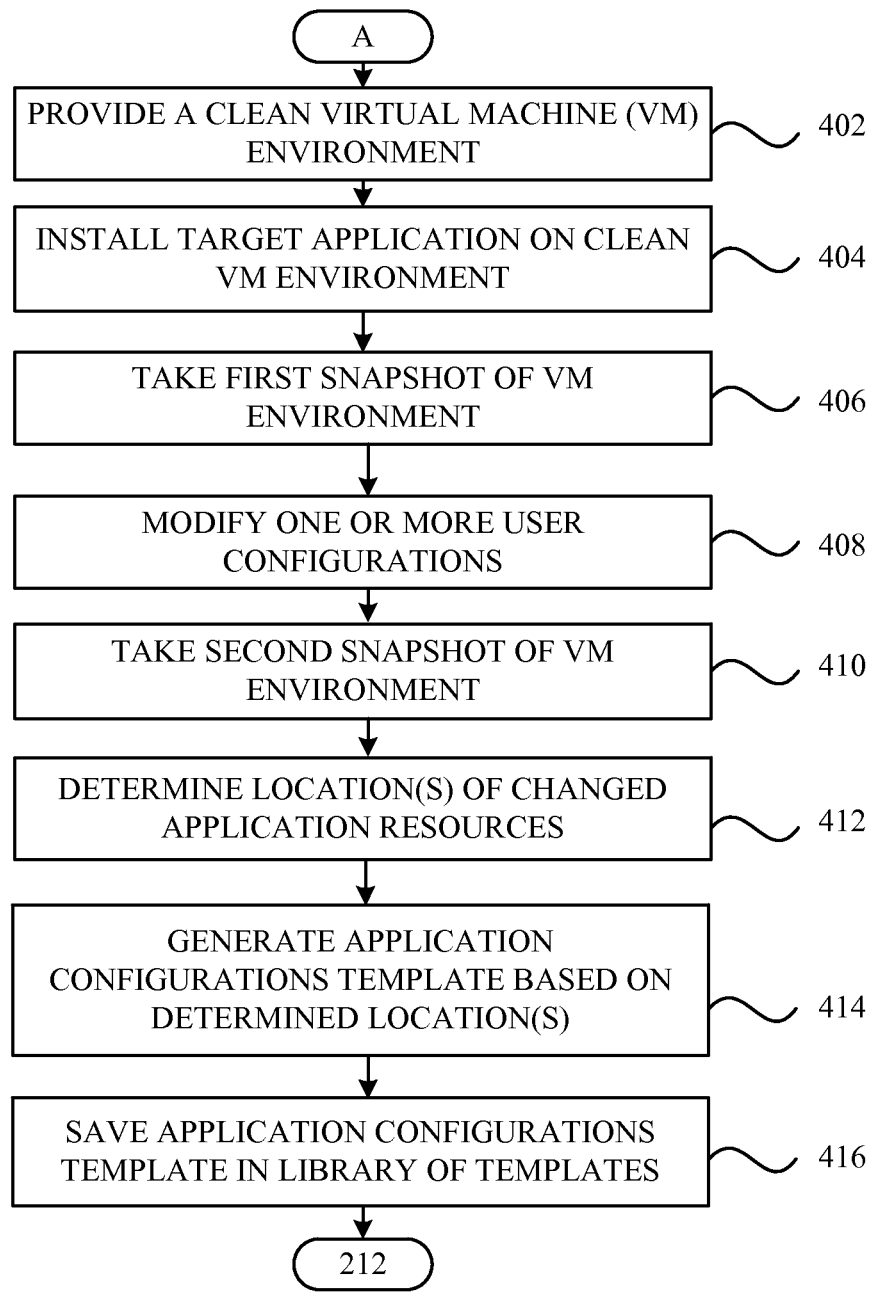
FIG. 4 is a flow diagram that illustrates steps of a method for generating an application configurations template according to an embodiment of the present invention.
Figure 5:
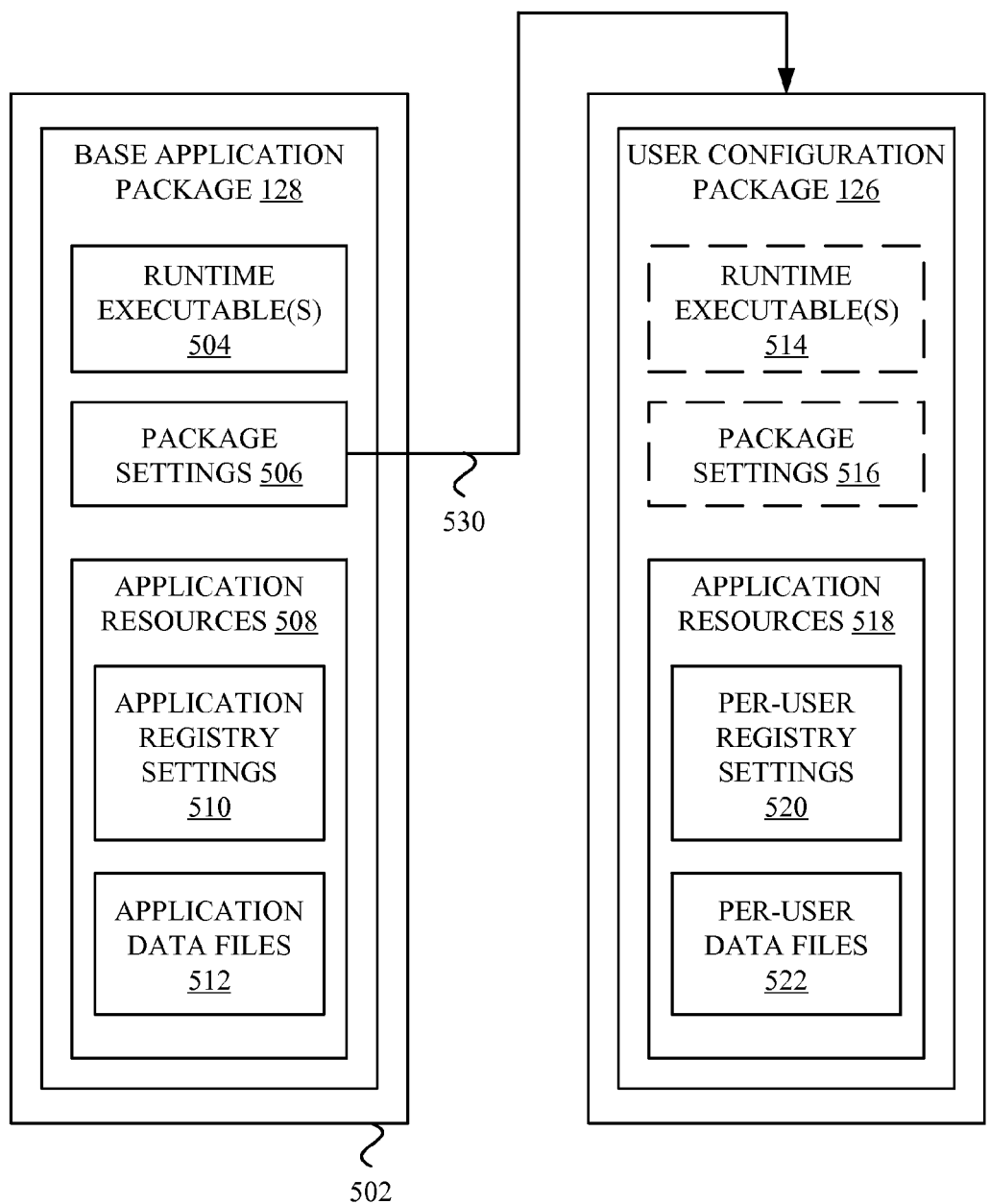
FIG. 5 depicts one embodiment of a user configuration package as generated by the method of FIG. 2.

FIG. 4 is a flow diagram that illustrates the steps of a method for generating an application configurations template for a target application, according to an embodiment of the present invention. At step 402, a "clean" VM environment is provided that does not have the target application installed already. At step 404, the target application is installed on the clean VM environment. At step 406, a first snapshot recording the state of the file system and registry, sometime referred to as a pre-scan, is taken of the VM environment just after installation. At step 408, one or more commonly performed configuration changes are made, for example, such as creating a new browsing profile, changing the home page of a browser, or changing the default signature of an email client. It should be recognized that the configuration changes performed during step 408 will result in changes to one or more application resources in the VM environment. At step 410, a second snapshot, sometimes referred to as a post-scan, is taken of the VM environment. At step 412, one or more locations of changed application resources are determined by comparing the first and second snapshots such that any differences between the snapshots provides the locations of any files or registry keys that were added, modified, or removed due to the user configuration changes performed at step 408. At step 414, a configurations template 118 is generated based on the determined locations and differential information. As described above, the configurations template 118 provides a roadmap for the migration tool 112 to extract and retrieve user configurations 116 from a client system 102. At step 416, the generated configurations template 118 may be saved for future use in a library of configurations templates, for example, at the application repository 120.

One example of the method of FIG. 4 is described next in the context of a user who wishes to migrate from a physical desktop having web browser application Firefox® 3.0 installed thereon to a virtualized desktop environment. As such, a configurations template 118 for Firefox® is created, if none is available. First, a clean VM is created and a clean installation of Firefox® 3.0 is installed. A snapshot ("snapshot1") of the VM is taken using an application such as the snapshot.exe utility made available by VMware, Inc. Then, one or more user configuration changes that a user is likely to make with a web browser application, such as changing the default home page, installing an add-on or extension, creating bookmarks, saving a HTTP cookie, or saving a password for a secure site, are made. A second snapshot ("snapshot2") is then taken. A VM utility compares the two snapshots and determines that changes were made to files located at \%AppData %\Mozilla\Firefox\Profiles and registry settings located at HKEY_LOCAL_MACHINE\SOFTWARE\Mozilla\Firefox\. This information is encapsulated in a configurations template 118 and used to capture the user's Firefox® configurations for migration.

Continuing with the above example, a user configuration package is created using the configurations template 118 for Firefox®. The migration tool 112 scans the physical desktop at locations specified by the configurations template 118, for example, by BaseDir1 and BaseReg1 parameters, and generates a snapshot ("userConfigSnapshot"). The migration tool 112 determines a difference between "snapshot" taken above and the "userConfigSnapshot" to generate a pre-cursor configuration file (e.g., package.ini) that contains packaging parameters for building the user configurations package 126.

The pre-cursor configuration file becomes the basis for the package settings contained in the user configuration package, described below in FIG. 5. The migration tool 112 then generates a user configuration package 126 for Firefox®. Subsequently, when a base Firefox® application is provisioned in the VDI environment, the generated user configuration package 126 may be linked to the provisioned Firefox® application, thereby providing the user with all of their customizations in the new VM.

FIG. 5 is one embodiment of virtual application packages including a base application package 128 and a user configuration package 126 generated by the method of FIG. 2. The base application package 128 and user configuration package 126 are linked such that, upon execution of the base application package 128, the virtualized execution environment merges in the application resources (i.e. user configurations) of the user configuration package 126.

The base application package 128 is a virtual application package configured to provide a virtualized execution environment isolated from an underlying operating system and configured to execute the application contained therein. In one embodiment, the base application package 128 includes one or more runtime executables 504 that implement a virtualization layer between the base application and underlying operating system, package settings 506, and a plurality of application resources 508 for executing the application contained therein. The package settings 506 allow a system administrator to alter the behavior and/or impose restrictions on the use of the base application package 128, as further described below. In one implementation, the package settings 506 are contained in a package configuration file having an "INP" format (e.g., package.ini).

In the embodiment described herein, the application resources include application registry settings 510 and application data files 512. The virtualization layer redirects read and write operations to and from the plurality of application resources using a mapping between locations of the application resources 508 and locations of the application resources within the virtualized execution environment. Further, in this embodiment, all of these components are packaged into a single container file 502, although other packaging arrangements are contemplated, such as, for example, separate files for each of the listed components.

The package settings 506 of the base application package 128 include at least one link 530 that refers to the user configuration package 126, such that the user configuration package 126 can be identified to be loaded during execution of the base virtual application. The link 530 may be specified as a file path, network path, and/or other suitable file identifier (e.g., Uniform Resource Identifier) that indicates a location for the user configuration package 126. In one embodiment, the base application package 128 is modified to include a custom generated link 530 to a user-specific file path containing the user configuration package 126. In another embodiment, the link 530 may utilize one or more variables or macro names (e.g., "% username %") that are evaluated by the virtualized execution environment to dynamically determine a file path to the corresponding user configuration package 126. The link 530 may be specified in a name-value pair format, such as in the examples provided below:

OptionalAppLinks=\\user-state\%username%\Firefox_Preferences.dat (1)

RequiredAppLinks=\\user-state\user12345\httpd.dat (2)

As shown in the example above, the link 530 may be specified as "mandatory" such that the execution of the virtual application is aborted if the linked user configuration package cannot be retrieved at the specified location. Alternatively, the link 530 may be specified as optional wherein the execution of the virtual application will continue even if the linked user configuration package cannot be found.

The user configuration package 126 is a virtual application package configured similarly to the base application package 128, except that the user configuration package 126 includes application resources 518 that provide per-user values for application-specific settings (i.e., user configuration). As shown, the application resources 518 of the user configuration package 126 include user-specific registry settings 520 and user-specific data files 522 that provide configurations that supplement and/or override default configurations determined by the application registry settings 510 and application data files 512 of the base application.

Figure 6A:
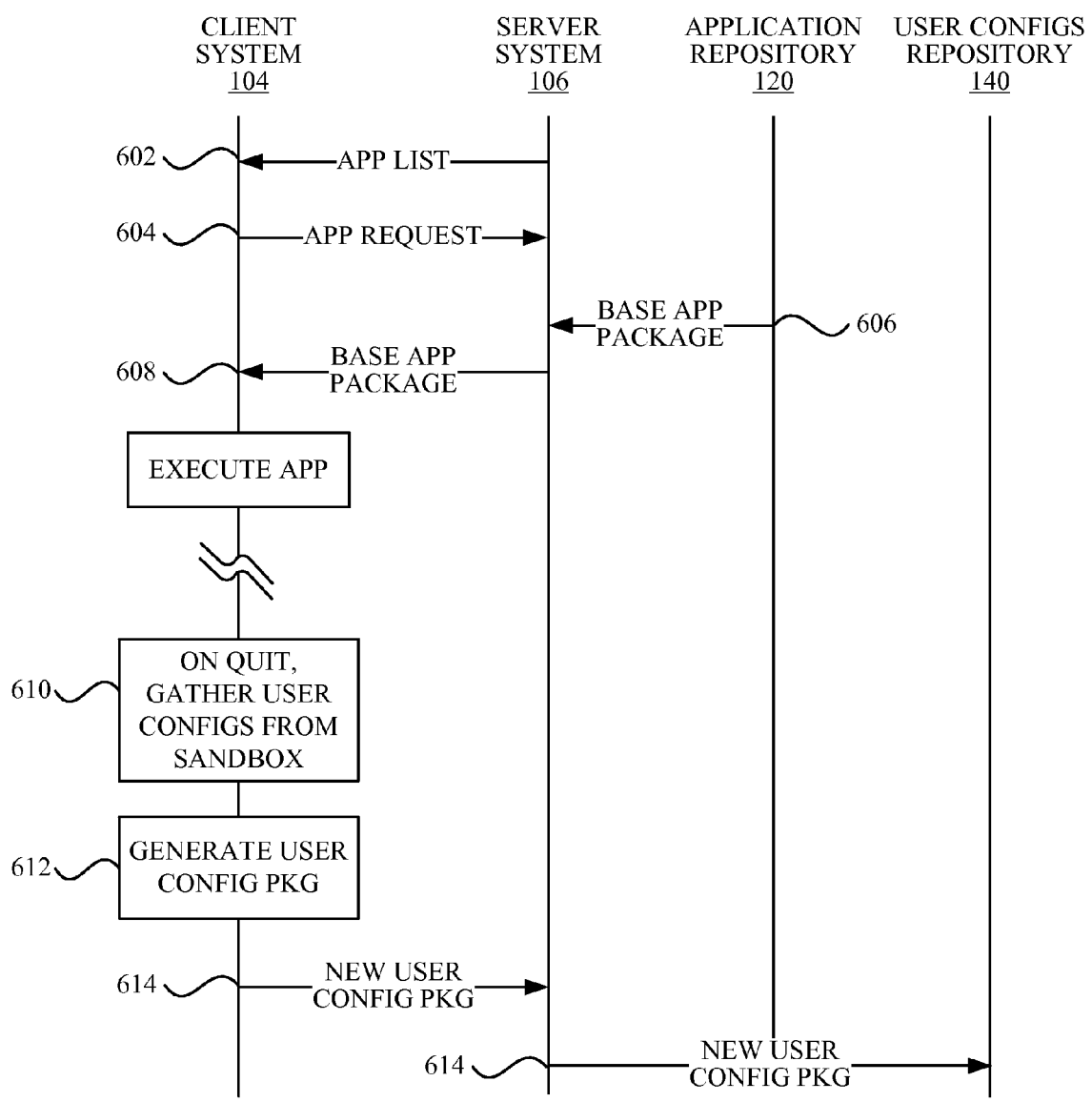
FIGS. 6A-6B are sequence diagrams that illustrate a method for streaming a virtual application having user customizations, according to one embodiment of the present invention.
Figure 6B:
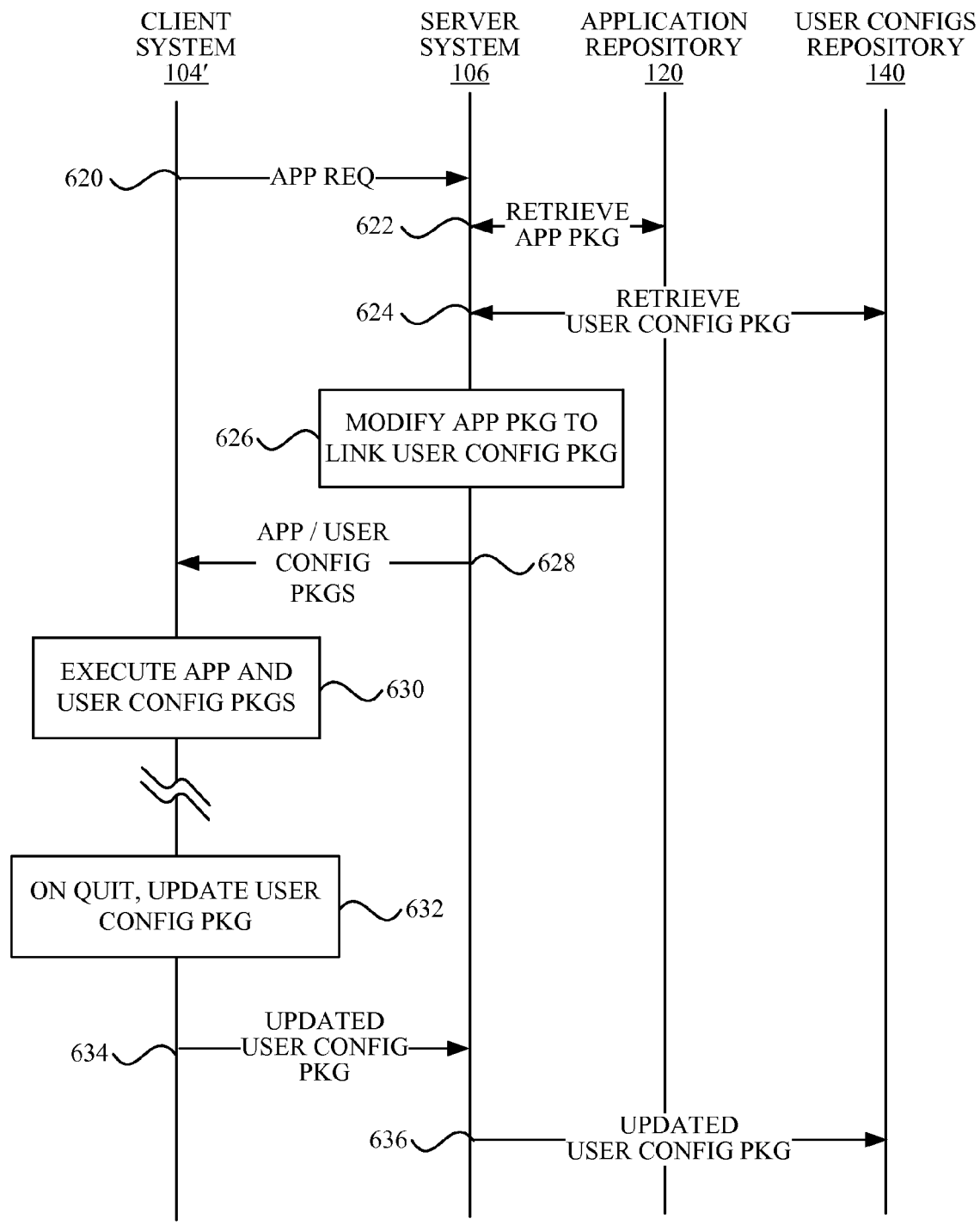

FIGS. 6A and 6B are sequence diagrams that illustrate a method for streaming a virtual application to a client system, according to one embodiment of the present invention. By way of example, migration of the Firefox® application as provisioned in a VDI environment may be performed as follows. VDI environments may be deployed in a persistent disk model where users can install their own required applications or in a linked-clone based model where a user's desktop reverts to a clean state whenever they log off such that only their profile data persists.

FIG. 6A illustrates a process for application migration in a VDI environment having a linked-clone based model for a user moving to a new client system 104'. At step 602, the server system 106 provides a filtered list of applications available to the user at the client system 104. The filtered list is a subset of the entire catalogue of applications available in the application repository 120 and may be predetermined by a system administrator for each user and/or group of users. In this example, the filtered list includes Firefox® because the user has been authorized by a system administrator to access the Firefox® application. At step 604, the user transmits a request to the server system 106 for provisioning of Firefox® as a virtual application. At step 606, the server system 106 receives the application request for Firefox® and streams a base virtual Firefox® package from the application repository 120 to the client system 104.

At step 608, the client system 104 receives the base Firefox® package and executes one or more runtime executables contained therein to generate a virtualized execution environment for the virtual application. The user operates the Firefox® application as needed, which may include changing one or more configurations for the application. As described above, any configuration changes are stored in the sandbox of the Firefox® virtual application. When the user logs off at step 610, changes to the file system and registry settings are extracted from the sandbox using, e.g., a utility that exports registry data in a transferable format, such as vregtool.exe available from VMware, Inc., and placed in a working directory. The migration tool 112 uses the extracted information to generate a package configuration file (e.g., package.ini) that contains packaging parameters for building the user configurations package. The template package configuration file becomes the basis of the package settings 516 ultimately included in the user configurations package 126. At step 612, the migration tool 112 generates a user configuration package 126 (e.g., "userConfigFirefox.dat") by bundling the files and registry data found in the working directory and/or at paths specified by the package configuration file. In one embodiment, at step 614, the client system 104 transmits the new user configuration package 126 to the server system 106 for central storage and management. At step 616, the server system 106 receives and stores the new user configuration package 126 in the user configurations repository 140.

One or more embodiments of the invention include a process for keeping track of the user configurations. Each time a user logs off, the migration tool 112 updates the user configuration package with new user configuration changes extracted from the sandbox of the virtual application. As such, when a user logs in for a next time, the updated user configuration package will be available and linked to the base virtual application from the repositories 120, 140. Accordingly, the migration tool 112 dynamically provisions and streams user-customized applications without any loss of user configurations. As such, embodiments of the invention allow user configurations for applications that are installed on a user's old desktop to be available in the new VM so that users can have consistent desktop experiences across sessions or before and after migrations.

FIG. 6B illustrates one example process for updating the user configuration package in the VDI environment shown in FIG. 6A for a user logging into a subsequent session (shown as client system 104'.) At step 620, the user logs into the client system 104 and requests the Firefox® virtual application. At step 622, the server system 106 retrieves the base Firefox® application package from the application repository 120 and at step 624, retrieves a user configuration package containing the user's custom Firefox® configurations from the user configurations repository 140.

At step 626, the server system 106 modifies the base Firefox® application package to link to the user's user configuration package. In one embodiment, the package settings 506 of the base Firefox® package are modified to set values of "RequiredAppLinks" or "OptionalAppLinks" parameters to refer to the user configurations package file (e.g., "userConfigFirefox.dat"). At step 628, the server system 106 streams the base Firefox® package and linked user configuration package to the client system 104'.

In an alternative embodiment, the client system 104' may first receive the base Firefox® package and process the base package to determine whether there are any linked user configuration packages specified in the package settings 506. If so, the client system 104' may subsequently request the user configuration package from the user configurations repository 140 using location information from the package settings 506.

At step 630, the client system 104' receives the base Firefox® package and user configurations package and executes the Firefox® virtual application. At 632, when the user logs out of the client system 104', the migration tool 112 updates the existing user configuration package by capturing any further Firefox® configuration changes from the sandbox and merging the changes into the existing user configuration package. At step 634, the updated user configuration package is transmitted to the server system 106 for central storage. At step 636, the server system 106 stores the updated user configuration package in the user configurations repository.

In one embodiment, the user configurations repository 140 replaces the user configuration package with the updated copy, merge the user configuration packages, or alternatively, utilize versioning techniques to retain previous versions of the user configurations for a history of modified user configuration packages for each user. Accordingly, the history of user configuration packages provides a history of application state which may be rolled back in case of application corruption or mis-configuration. These versioning techniques may be extended to perform reconciliation if conflicting user configurations are received (for example, if the same user starts two different client sessions from different desktops).

In an alternative embodiment where the VDI environment uses a persistent disk model, the client system 104 may store the newly created user configuration package 126 in a persistent user data disk. The next time the user logs into their user desktop, the base application package is again streamed to the user desktop. When the base application package is executed, the migration tool 112 locates the previously-generated user configuration package stored in persistent local disk and merges the user configuration package with the base application. Any further changes to the configuration of Firefox® are captured from the sandbox, and merged into the user configuration package stored in persistent disk.

Embodiments of the invention provide an application migration technique that may be advantageously utilized in several use cases, including virtual desktop infrastructures (as discussed above), disaster recovery, application syncing across multiple desktops, and survey tools. For example, conventional techniques for disaster recovery require duplicate desktop images to be backed up. However, full image backups require a large amount of disk space and consume a large amount of bandwidth to create and maintain. Embodiments of the invention may advantageously isolate user configurations from applications and permit just user configurations and user profile data to be backed up, thereby saving unnecessary storage of duplicate applications. Hence, in case of a disaster, fresh desktops can be created quickly with stored user profile data and saved user configurations.

Embodiments of the invention not only permit portability of settings across different computers, but also allow application syncing across multiple desktops of a single user. For example, if a user wants to work on the same application on multiple desktops (e.g., office and home desktops), then the application migration techniques described herein can sync their application states across desktops.

Embodiments of the invention may also be utilized by system administrators as a survey tool executed on end-user desktops prior to a large migration. For example, the migration tool 112 may collect a list of application that each user has installed on their physical desktop and automatically provisions a matching set of virtual applications when the user logs into a virtual desktop. This may be useful for creating trial run sandbox desktops prior to migration or may be useful for capacity planning of a physical to virtual desktop migration in terms of needed resources and applications.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for migrating application settings customized by a user for an installed application having a plurality of application settings, the method comprising:
generating an application configurations template by executing a process including:
providing a virtualized execution environment having an application installed thereon, the application being in a base application state;
capturing a first snapshot of the virtualized execution environment;
performing one or more user configurations of the application;
capturing a second snapshot of the virtualized execution environment; and
processing the first and second snapshots to determine a location of application settings modified between the first and second snapshots;
retrieving the application configurations template that identifies a location within a first execution environment of a subset of application settings of the application that are determined to be customizable by the user, wherein remaining application settings of the application that are outside of the subset define a base application state; and
generating a virtual application package that includes the subset of application settings for the application associated with the user, wherein the virtual application package is to be merged with a base virtual application package comprising the base application state executing in a second execution environment.

2. The method of claim 1, further comprising:
executing the base virtual application package and virtual application package to generate a virtualized execution environment for the application;
determining one or more changes to the virtualized execution environment comprised of application settings modified after generation of the virtualized execution environment; and
updating the virtual application package to include the one or more determined changes.

3. The method of claim 1, further comprising:
retrieving the application configurations template from a pre-determined library of application configurations templates.

4. The method of claim 1, further comprising:
retrieving the application configurations template based on a match of a name and version of the installed application against a list of available virtual applications.

5. The method of claim 1, further comprising:
modifying the base virtual application package to link to the virtual application package in a parent-child relationship.

6. The method of claim 1, further comprising:
storing the virtual application package in a central repository for virtual application packages comprising user configurations.

7. A method for executing a virtual application for a user, the method comprising:
receiving a base virtual application package from a virtual application repository, wherein the base virtual application package comprises a plurality of application settings that define a base application state;
executing the base virtual application package based on the plurality of application settings to provide a virtualized execution environment for executing the virtual application;
modifying the virtualized execution environment to merge in prior user configurations obtained using an application configurations template, wherein the application configurations template is generated by executing a process comprising:
providing a temporary virtualized execution environment having the application installed thereon, the application being in a base application state;
capturing a first snapshot of the temporary virtualized execution environment;
performing one or more user configurations of the application;
capturing a second snapshot of the temporary virtualized execution environment; and
processing the first and second snapshots to determine a location of application settings modified between the first and second snapshots;
determining a subset of the plurality of application settings that have been customized during execution of the base virtual application package;
recording the subset of the plurality of application settings in a sandbox directory, wherein, after said recording, the subset of application settings are isolated from the application settings not in the subset; and
generating a virtual application package that includes the subset of application settings for the virtual application associated with the user, wherein the virtual application package is to be merged with the virtual execution environment provided by the base virtual application package.

8. The method of claim 7, further comprising:
providing the generated virtual application package to a user configurations repository.

9. The method of claim 7, wherein modifying the virtualized execution environment to merge in the prior user configurations obtained using the application configurations template further comprises:
prior to determining the subset of application settings, receiving a user configuration package associated with the user from a user configurations repository, wherein the user configuration package comprises a plurality of application settings that define one or more user configurations associated with the user; and
modifying the virtualized execution environment to merge in the plurality of application settings that define the user configurations associated with the user.

10. The method of claim 9, wherein the generating the virtual application package further comprises:
modifying the received user configuration package to include the determined subset of application settings that define user configurations performed during execution of the virtualized execution environment.

11. A method for providing an application for a user on a computer system, the method comprising:
receiving, from the user, a request for a virtual application, the request comprising a user identifier associated with the user;
retrieving a first virtual application package from a virtual application repository, wherein the first virtual application package includes a first plurality of application settings that define a base application state for the virtual application;
retrieving, from a storage system, a second virtual application package of a user configurations repository based on the user identifier, wherein the second virtual application package includes a second plurality of application settings for the virtual application that define one or more user configurations of the virtual application for the user; and
providing the first and second virtual application packages to the user, wherein the first virtual application package is to be linked to the second virtual application package such that, when the virtual application is executed, configuration settings included in the second plurality of application resources override corresponding configuration settings included in the first plurality of application resources,
wherein the second virtual application package is generated based on an application configurations template that identifies a location within an execution environment of a subset of application settings of the application that are determined to be customizable by the user,
wherein the applications configurations template is generated by executing a process including:
providing a temporary virtualized execution environment having the application installed thereon, the application being in a base application state;

capturing a first snapshot of the temporary virtualized execution environment;

performing one or more user configurations of the application;

capturing a second snapshot of the temporary virtualized execution environment; and processing the first and second snapshots to determine a location of application settings modified between the first and second snapshots.

12. The method of claim 11, further comprising:

receiving, from the user, an updated virtual application package comprising application resources that define modified user configurations for the user for the virtual application; and modifying the user configurations repository to include the updated virtual application package associated with the user and associated with the virtual application.

13. The method of claim 11, further comprising:

receiving, from the user, an updated virtual application package comprising application settings that define user configurations for the user; and storing the updated virtual application package as a latest version of user configurations associated with the user.

* * * * *